Aug. 25, 1936.  F. Y. CHUCK  2,052,082
DISINTEGRATING AND DISTRIBUTING APPARATUS
Filed April 9, 1935
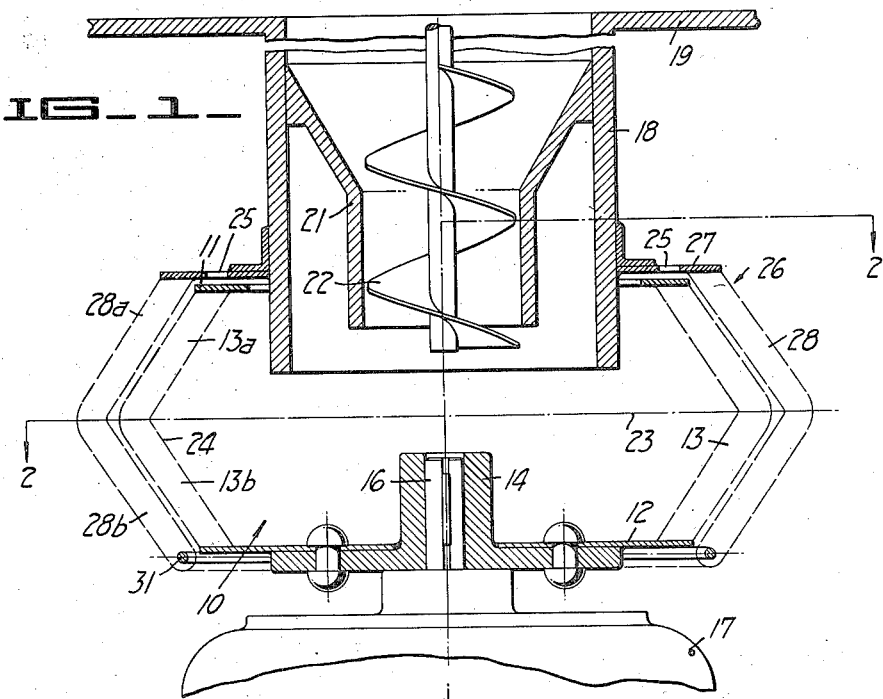
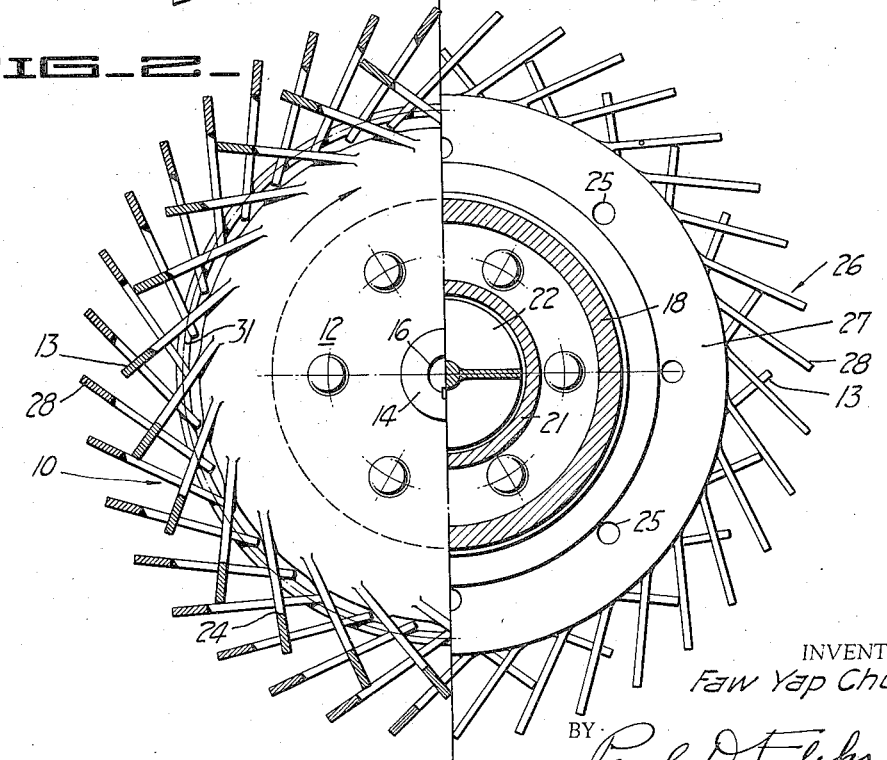
INVENTOR.
Faw Yap Chuck
BY
ATTORNEY.

Patented Aug. 25, 1936

2,052,082

UNITED STATES PATENT OFFICE 2,052,082

DISINTEGRATING AND DISTRIBUTING APPARATUS

Faw Yap Chuck, San Francisco, Calif.

Application April 9, 1935, Serial No. 15,432

6 Claims. (Cl. 259—23)

This invention relates generally to apparatus for the breaking up of plastic or semi-plastic masses of material into divided form, with distribution of the divided material into contact with a treatment gas. Such apparatus is useful where it is desired to effect contact with a drying gas, to produce a dried or desiccated divided product, where it is desired to effect a chilling and hardening by contact with cool gas, or where special conditioning of material in divided form with a particular vapor or gas is required.

It is an object of the invention to provide an apparatus of the above character capable of successfully handling plastic or semi-plastic materials without clogging and with the production of a relatively uniform granular product. By "plastic or semi-plastic materials", reference can be made to a substance such as molasses, which may be mixed with filler mediums such as chopped alfalfa or other vegetable matter, where it is desired to carry out a spray drying operation to form a dry granular product. I have reference also to granular material mixed with a molten wax, where it is desired to carry out a chilling operation to form a hardened wax coating for the particles.

Further objects of the invention will appear from the following description, in which the preferred embodiment of the invention has been set forth in detail in conjunction with the accompanying drawing.

Referring to the drawing:

Fig. 1 is a side elevational view, in cross-section, illustrating an apparatus incorporating the present invention.

Fig. 2 is a cross-sectional view taken along the line 2—2 of Fig. 1.

The apparatus shown in the drawing consists of a basket 10 adapted to be rotated at a relatively high speed. This basket includes upper and lower end walls 11 and 12, respectively, in conjunction with the interconnecting circumferentially spaced vanes 13. In order to mount the basket 10 for rotation at a relatively high speed, the lower wall 12 is shown attached to a hub 14, which in turn is carried by the shaft 16 of an electric motor 17.

In order to supply plastic or semi-plastic material to the interior basket 10, a conduit 18 is shown, which generally extends downwardly from the upper wall 19 of the treatment chamber, through the upper wall 11 of the basket. Feed means can be provided in the interior of conduit 18, as for example a conical shaped member 21 in conjunction with a rotatable feed screw 22.

The preferred form for the vanes 13 can be best understood by reference to Fig. 2, in conjunction with the contour shown in Fig. 1. Thus, each vane is disposed in a plane inclined with respect to a radius drawn through it from the axis of shaft 16. Likewise the plane of each vane is generally vertical. The upper and lower bar-like portions 13a and 13b, respectively, are at an angle with each other, so that a medial horizontal plane 23 taken through the basket is at the largest diameter. Thus, with respect to the outer periphery of the basket 10, it corresponds generally to the surfaces of two intersecting truncated cones having their axes concentric with the axis of shaft 16. This is likewise true with respect to the inner periphery afforded by the inner edges 24 of vanes 13, since the inner and outer edges of the vanes are substantially parallel.

In conjunction with the rotatable basket described above, an outer stationary basket 26 is also provided. This outer basket includes an upper end wall 27 which is carried by the depending conduit 18, and which is provided with vent openings 25. Vanes 28 have their upper ends secured to the wall 27, and are arranged to surround the zone of operation of the inner rotatable vanes 13. Each of the vanes 28 is likewise disposed in a plane inclined with respect to a radius drawn through it from the axis of shaft 16, although, as is apparent in Fig. 2, the inclination is in an opposite direction compared with the inclination of vanes 13. Thus, with respect to the direction of rotation of the inner basket, indicated by the arrow in Fig. 2, the inner vanes 13 are inclined rearwardly while the outer vanes 28 are inclined forwardly. The shaping of vanes 28 is similar to that of vanes 13, in that they are disposed in substantially vertical planes with their upper and lower portions 28a and 28b at an angle to each other, whereby the largest diameter of the outer basket is substantially coincident with the medial plane 23. For connecting together the lower extremities of vanes 28 in proper spaced relationship, a tie rod 31 or like device can be employed. In practice, it is convenient to form the tie rod 31 and also the upper wall 27 in two semi-circular sections, to facilitate assembly and removal of the outer basket.

Operation of the apparatus described above is as follows:—Assuming that a plastic or semi-plastic mass of material is to be dried or desiccated, the device is disposed within a suitable desiccating chamber in which hot dried gas can be maintained. The upper wall of the desiccating chamber may correspond to wall 19, and the vertical center of the baskets 10 and 26 may be substantially coincident with the vertical axis of the drying chamber. The material is introduced into the upper part of conduit 18, and by operating screw 22 it is fed at a regulated rate into the rotating basket 10. Here the material is subjected to the disrupting forces of rapidly moving air currents, and to outwardly centrifugal force in contacting with the lower wall 12. As a result, the material is thrown outwardly, and impacted by the rapidly moving vanes 13. Such impact upon the vanes 13 tends to break up the mass of material thrown centrifugally from or impacted away from vanes 13 is further impacted upon the stationary vanes 28. The net result is that the mass of material is broken down into particles of substantially uniform size which are discharged outwardly from the periphery of the outer basket 26 to be subjected to the desiccating action of the surrounding drying medium.

In some applications the apparatus may be utilized to chill the particles of material after they are broken up, in which event the gaseous medium may be relatively cool air. For example, solid material intermixed with a molten wax to form a plastic or semi-plastic mix, may be fed to the apparatus with chilling after being broken up, to form a granular product having the particles coated with hardened wax. A further possible application is the treating of material with special gases, as for example gas containing a definite amount of moisture to effect a moisture-conditioning operation.

A particular characteristic of the apparatus described above is that it will not become clogged with the plastic or semi-plastic material upon which it is operating. This is due in part to the shaping of the vanes for the inner and outer baskets, which avoids clinging of the material on surfaces which it may contact, and is also due to the use of repeated impact, so that in general the vanes are self-cleaning. A further characteristic is that the divided material is not thrown outwardly from the stationary basket with such momentum as to cause it to continue laterally to plaster surrounding side walls of the desiccating or treatment chamber. This is because the outer vanes 28 tend to break the force of outwardly moving air currents, so that while the discharged divided material spreads outwardly it also falls downwardly, with proper distribution in the treatment gas.

I claim:

1. In apparatus of the character described, a basket, means for rotating the basket about a vertical axis, and means for introducing plastic or semi-plastic material into the interior of the basket, the periphery of the basket being formed by circumferentially spaced vanes inclined with respect to radii drawn from the axis of rotation, the periphery conforming generally to the surfaces of two intersecting truncated cones having their axes concentric with respect to the axis of rotation, a horizontal plane taken medially through the basket intermediate its upper and lower ends intersecting the largest diameter of the vanes.

2. In apparatus of the character described, a basket, means for rotating the basket about a vertical axis, means for introducing plastic or semi-plastic material into the interior of the basket, the periphery of the basket being formed by circumferentially spaced vanes inclined with respect to radii drawn from the axis of rotation, the periphery conforming generally to the surfaces of two intersecting truncated cones having their axes concentric with respect to the axis of rotation, a horizontal plane taken medially through the basket normal to the axis of rotation and intermediate its upper and lower ends intersecting the largest diameter of the vanes, and a stationary basket associated with the rotary basket, the stationary basket including circumferentially spaced vanes surrounding the zone of operation of the vanes included in the rotary basket.

3. In apparatus of the character described, a basket, means for rotating the basket about a vertical axis, means for introducing plastic or semi-plastic material into the interior of the basket, the periphery of the basket being formed by circumferentially spaced vanes inclined with respect to radii drawn from the axis of rotation, the periphery conforming generally to the surfaces of two intersecting truncated cones having their axes concentric with respect to the axis of rotation, a horizontal plane taken medially through the basket intermediate its upper and lower ends intersecting the largest diameter of the vanes, and a stationary basket associated with the rotary basket, said stationary basket including circumferentially spaced vanes surrounding the zone of operation of the vanes on the rotary basket, the vanes on the stationary basket being inclined with respect to radii drawn from the axis of rotation but in a direction opposite to the inclination of the vanes on the rotary basket.

4. In apparatus of the character described, a basket, means for rotating the basket about a vertical axis, means for introducing plastic or semi-plastic material into the interior of the basket, the periphery of the basket being formed by circumferentially spaced vanes inclined with respect to radii drawn from the axis of rotation, the periphery of the basket conforming generally to the surfaces of two intersecting truncated cones having their axes concentric with respect to the axis of rotation, a horizontal plane taken medially through the basket intermediate its upper and lower ends intersecting the largest diameter of the vanes, and a stationary basket including circumferentially spaced vanes inclined with respect to radii drawn from the axis of rotation but in a direction opposite to the inclination of the vanes on the rotary basket, the periphery of the stationary basket likewise conforming generally to the surfaces of two intersecting truncated cones having their axes concentric with respect to the axis of rotation, said horizontal plane likewise intersecting the largest diameter of the vanes for the stationary basket.

5. In apparatus of the character described, a basket, means for rotating the basket about a vertical axis, means for supplying material into the interior of the basket, the periphery of the basket being formed by circumferentially spaced vanes and conforming generally to the surfaces of two intersecting truncated cones having their axes concentric with respect to the axis of rotation, and a stationary basket concentric with the rotary basket and having circumferentially spaced vanes surrounding the vanes of the rotary basket.

6. In apparatus of the character described, a basket, means for rotating the basket about a vertical axis, means for supplying material into the interior of the basket, the periphery of the basket being formed by circumferentially spaced vanes and conforming generally to the surfaces of two intersecting truncated cones having their axes concentric with respect to the axis of rotation, and a stationary structure concentric with the rotary basket and having circumferentially spaced elements surrounding the vanes of the rotary basket, whereby material discharged from the periphery of the basket is caused to impact upon said elements.

FAW YAP CHUCK.